United States Patent [19]
Koike

[11] 4,455,088
[45] Jun. 19, 1984

[54] MONOCHROMATOR WITH CONCAVE GRATING

[75] Inventor: Masato Koike, Kyoto, Japan

[73] Assignee: Shimadzu Corporation, Kyoto, Japan

[21] Appl. No.: 347,417

[22] Filed: Feb. 10, 1982

[51] Int. Cl.³ .............................................. G01J 3/20
[52] U.S. Cl. .................................. 356/334; 350/3.70; 350/162.21
[58] Field of Search ...................... 356/305, 328, 334; 350/3.70, 162.21, 162.23

[56] References Cited

U.S. PATENT DOCUMENTS 3,628,849 12/1971 Flamand ........................... 350/3.7 X
3,930,728 1/1976 Pieuchard et al. .............. 350/3.7
3,973,850 8/1976 Pouey ................................. 356/33
3,985,443 10/1976 Danielsson et al. ............ 356/305
4,068,954 1/1978 Da Silvo ............................. 356/33

Primary Examiner—F. L. Evans
Attorney, Agent, or Firm—Fidelman, Wolffe & Waldron

[57] ABSTRACT

A constant deviation monochromator with a holographically formed concave grating and entrance and exit slits positioned on opposite sides of the plane including the Rowland circle of the grating, wherein the grating has been formed by using two coherent light sources positioned on the same side of the Rowland plane, whereby aberrations and stray light are substantially reduced.

11 Claims, 5 Drawing Figures (a)

(b)

(c)

MONOCHROMATOR WITH CONCAVE GRATING

BACKGROUND OF THE INVENTION

This invention relates to a monochromator which employs a diffraction grating having a groove pattern formed by holography.

In a monochromator which employs a diffraction grating, various points on the inner wall of the housing of the instrument illuminated by the diffracted light become secondary sources, the light from which strikes the grating again and a part of the doubly diffracted light goes through the exit slit as stray light. To reduce such stray light it has been proposed to arrange the entrance and exit slits in the different spaces divided by a horizontal plane including the Rowland circle, which plane will be referred to as the Rowland plane.

Suppose, for example, that the entrance and exit slits are positioned above and below the Rowland plane, respectively. The diffracted light rays from the grating will hit the inner wall of the housing of the monochromator at points below the Rowland plane, so that the doubly diffracted light will strike the inner wall at points above the Rowland plane and will not come out of the exit slit positioned below the plane, with resulting decrease in the amount of stray light coming out of the exit slit.

In conventional in-plane monochromators, it has been customary to align the entrance and exit slits in the Rowland plane. If, with a conventional grating, the entrance and exit slits are mounted off the Rowland plane by the same distance on different sides of the plane, the aberrations will increase considerably. This type of mounting will be referred to as the off-plane mounting. There is an increasing demand for a grating for the off-plane mounting which has a small aberration as possible.

There are known two methods of forming diffraction gratings. In one of the two methods the grating grooves are ruled mechanically by means of the ruling engine. The other method utilizes interference of a pair of coherent light beams to form the grooves. The grating formed by the former method will be referred to as the mechanical grating while the grating formed by the latter method will be referred to as the holographic grating.

In recent years, the holographic grating has come into increasing use in grating monochromators because of the advantage that aberrations can be substantially reduced or eliminated by selecting the positions of the two recording point sources which determine the groove pattern.

If the entrance and exit slits are positioned at the same points as the two recording sources, respectively, and one of the slits is at the center of curvature of the concave grating, the light which has the same wavelength as the recording sources goes through the exit slit and the image at the exit slit has no aberration. For a constant deviation monochromator which has a grating formed by using recording sources having a wavelength within the predetermined wavelength range covered by the monochromator, the entrance and exit slits may well be adjacent to the positions of the recording sources in order to minimize aberrations within the whole wavelength range.

Therefore, it is conceived that a holographic grating for use in an off-plane monochromator is formed by using recording sources deviated from the Rowland plane toward different sides of it to reduce the aberration due to the off-plane mounting. However, it has been found out that the arrangement cannot attain the intended object.

SUMMARY OF THE INVENTION

Accordingly, it is one object of the invention to provide a monochromator wherein stray light is substantially eliminated without increasing the aberrations of the grating and deteriorating the imaging properties thereof.

Another object of the invention is to provide a holographically formed concave diffraction grating which has small aberrations and enables the off-plane mounting of the entrance and exit slits in a monochromator without increasing the aberrations and deteriorating the imaging properties of the grating.

Another object of the invention is to provide such a holographic concave grating as aforesaid which can be formed with comparative ease.

Briefly stated, the monochromator constructed in accordance with the invention employs a holographic concave diffraction grating formed by using a pair of coherent light sources arranged at the same side of the Rowland plane of the grating for recording of the groove pattern, and the entrance and exit slits of the monochromator are arranged away from the Rowland plane on opposite sides thereof. If the positional relation of the grating blank and the two recording light sources is defined in more general terms, the two light sources are so arranged for holographic recording of the groove pattern that the normal at the center of the grating blank and the two lines each connecting the center of the grating blank and one of the two light sources are not in the same plane.

DETAILED DESCRIPTION OF THE INVENTION

Figure 1:
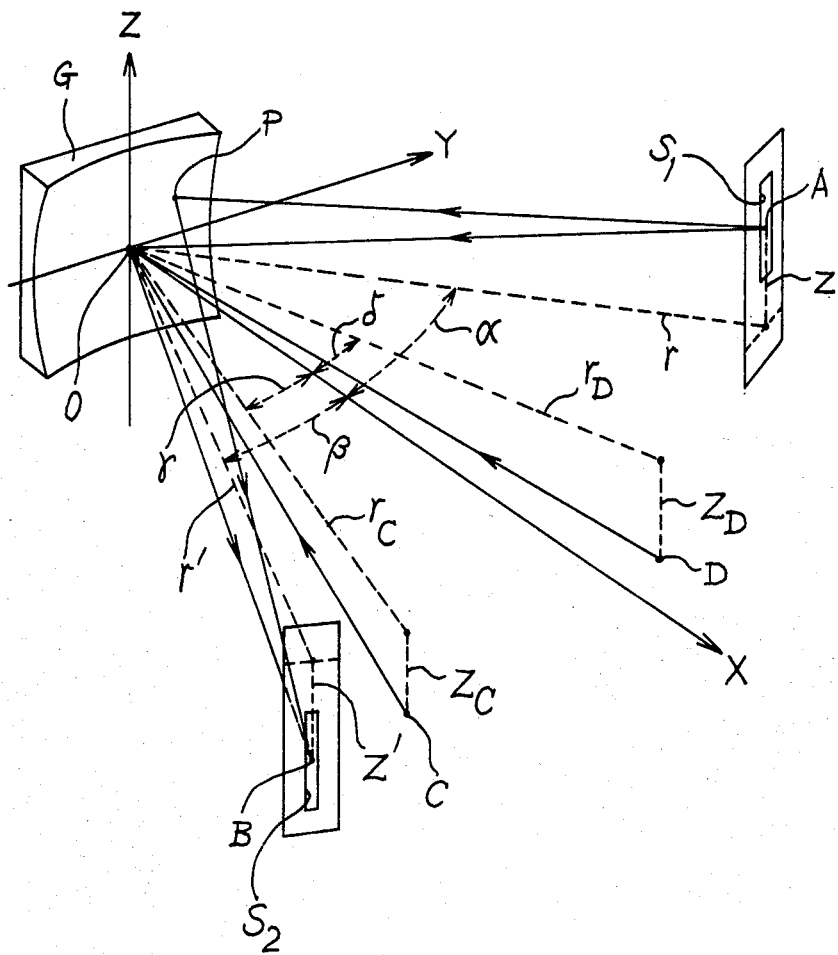
FIG. 1 is a schematic perspective view of the optical system of a monochromator constructed in accordance with the invention together with the positions of the two light sources used for holographic formation of the groove pattern of the grating.

Referring to FIG. 1, there is schematically shown a monochromator the optical system of which comprises a spherical concave diffraction grating G, an entrance slit $S_1$, and an exit slit $S_2$. The monochromator is a constant deviation of off-plane mounting type, in which the grating G only is rotated for wavelength scanning and the entrance and exit slits are arranged above and below, respectively, the XY-plane to be described below.

The optical system is illustrated in association with a Cartesian (cylindrical) coordinate system, wherein the origin 0 is at the geometrical center of the grating, at which the X-axis is normal. The XY-plane is the Rowland plane and the points C ($r_C$, $\gamma$, $Z_C$) and D ($r_D$, $\delta$, $Z_D$) indicate the positions of two coherent light sources for holographic recording of the groove pattern, where $\gamma$ and $\delta$ are the incident angles of the coherent light rays measured to the XY-plane.

Let it be assumed that a light ray originates at a point A (r, $\alpha$, Z) in the entrance slit $S_1$ and hits the grating G at a point P ($\xi$, $\omega$, l), and the diffracted light of wavelength $\lambda$ in the m-th order from the point P passes a point B (r', $\beta$, Z') in the exit slit $S_2$, where $\alpha$ and $\beta$ are respectively the angles of incidence and diffraction both measured in the XY-plane.

For a constant deviation monochromator in which the grating rotates on its axis to scan wavelength, we have $$r, r' = \text{const.}, Z, Z' = \text{const.}, 2K = \alpha - \beta = \text{const.}, \alpha = K + \theta, \text{ and } \beta = \theta - K \quad (1)$$

where 2K is the angle AOB projected onto the XY-plane and $\theta$ is the angle of rotation of the grating which is measured from the bisector of the angle 2K and which has the same sign as that of the spectral order m.

If the grating has a radius of curvature R, the light-path function F for the ray APB can be expressed as:

$$F = F_{000} + \omega F_{100} + lF_{010} + \frac{\omega^2}{2} F_{200} + \frac{l^2}{2} F_{020} + \frac{\omega^3}{2} F_{300} + \frac{\omega l^2}{2} F_{120} + \omega l F_{111} + \ldots \quad (2)$$

where $F_{ijk} = C_{ijk} + (m\lambda/\lambda_0)H_{ijk}$, $\lambda_o$ is the wavelength of the pair of coherent light sources used for recording of the groove pattern, and the subscripts ijk of $F_{ijk}$ are the exponents of $\omega^i l^j Z^k$ except for $F_{000}$. For the explicit expressions for $C_{ijk}$ and $H_{ijk}$ reference should be had to Journal of the Optical Society of America, 64, 1031 (1974), H. Noda, T. Namioka and M. Seya.

In the following explanation the parameters $r_C$, $r_D$, $\gamma$, $\delta$, $Z_C$ and $Z_D$ will be referred to as the recording parameters since they are related to the positions of the coherent light sources for recording of the grating groove; and the parameters Z, Z', $Z_C$ and $Z_D$ will be referred to as the off-plane parameters since they are related to the off-plane mounting of the holographic recording light sources and the entrance and exit slits.

In Eq. (2) the terms $F_{000}$, $F_{100}$, $F_{200}$, $F_{020}$, and $F_{120}$ are free from the off-plane parameters Z, Z', $Z_C$ and $Z_D$. The recording parameters $r_C$, $r_D$, $\gamma$ and $\delta$ are so determined as to minimize the terms $F_{200}$, $F_{020}$ and $F_{120}$.

The terms $F_{011}$ and $F_{111}$ contain the off-plane parameters as follows:

$$F_{011} = -\frac{(Z/r)}{\sqrt{1+(Z/r)^2}} - \frac{(Z'/r')}{\sqrt{1+(Z'/r')^2}} + \left(\frac{m\lambda}{\lambda_0}\right)\left(-\frac{Z_C/r_C}{\sqrt{1+(Z_C/r_C)^2}} + \frac{Z_D/r_D}{\sqrt{1+(Z_D/r_D)^2}}\right), \quad (4)$$

$$F_{111} = -\frac{Z}{r^2}\sin\alpha - \frac{Z'}{r'^2}\sin\beta + \quad (5)$$

-continued $$\left(\frac{m\lambda}{\lambda_0}\right)\left(-\frac{Z_C}{r_C^2}\sin\tau + \frac{Z_D}{r_D^2}\sin\delta\right).$$

Carrying out power-series expansions of the square root terms in Eq. (4), the following equation (4') is obtained as an approximation to Eq. (4):

$$F_{011} = -\frac{Z}{r} - \frac{Z'}{r'} + \left(\frac{m\lambda}{\lambda_0}\right)\left(-\frac{Z_C}{r_C} + \frac{Z_D}{r_D}\right) \quad (4')$$

The term $F_{011}$ defines the direction of the principal ray of the diffracted light in the sagital plane. Therefore, the value Z' can be determined from $F_{011} = 0$ as a function of Z, $Z_C$ and $Z_D$.

In order to reduce the amount of aberrations of the off-plane mounting, the value of the term $F_{111}$ must be minimized under the condition of $F_{011} = 0$.

To this end, the following two cases A and B have been examined by way of example:

Case A where $$Z_C/r_C = Z_D/r_D = \phi \quad (6)$$

and case B where $$Z_C/r_C \cos\gamma = Z_D/r_D \cos\delta = \tan\phi \quad (7)$$

In case A, the condition of $F_{011}' = 0$ is reduced to $$Z/r = Z'/r'. \quad (8)$$

Substitution of Eqs. (6) and (8) into Eq. (5) yields $$F_{111} = -\frac{Z}{r^2}\sin\alpha - \frac{Z'}{r'^2}\sin\beta + \frac{m\lambda}{\sigma}A_{111} \quad (9)$$

where $\sigma$ is the effective grating constant and $$A_{111} = \frac{\sigma}{\lambda_0}\left(\frac{\sin\delta}{r_D^2} - \frac{\sin\tau}{r_C^2}\right)\phi. \quad (10)$$

In order to minimize the value of the term $F_{111}$ by choosing the value of $A_{111}$, the following equation must be solved:

$$\partial I_{111}/\partial A_{111} = 0 \quad (11)$$

where $$I_{111} = \int_{\theta_1}^{\theta_2} F_{111}^2 \, d\theta$$

where $\theta_1$ and $\theta_2$ are the angles of rotation of the grating corresponding to a predetermined scanning wavelength range $\lambda_1 < \lambda < \lambda_2$ and are obtained by:

$$\theta = \sin^{-1}(\lambda/2\sigma \cos K) \quad (12)$$

Eq. (11) is reduced to $$A_{111} = \frac{C_2(\theta_2) - C_2(\theta_1)}{C_1(\theta_2) - C_1(\theta_1)} \quad (13)$$

where $$C_1(\theta) = 2\theta(1 + \cos 2K) - \sin 2\theta - \sin 2\theta \cos 2K \quad (14)$$

$$C_2(\theta) = \frac{Z}{r^2}[\theta(1 + \cos 2K) - \frac{1}{2}\{\sin 2\theta + \sin 2(K + \theta)\}] +$$

$$\frac{Z}{rr'}[\theta(1 + \cos 2K) - \frac{1}{2}\{\sin 2\theta + \sin 2(\theta - K)\}].$$

If the proper value of $A_{111}$ is known, the recording parameters $Z_C$ and $Z_D$ can be obtained from Eq. (6) through Eq. (10).

Figure 2:
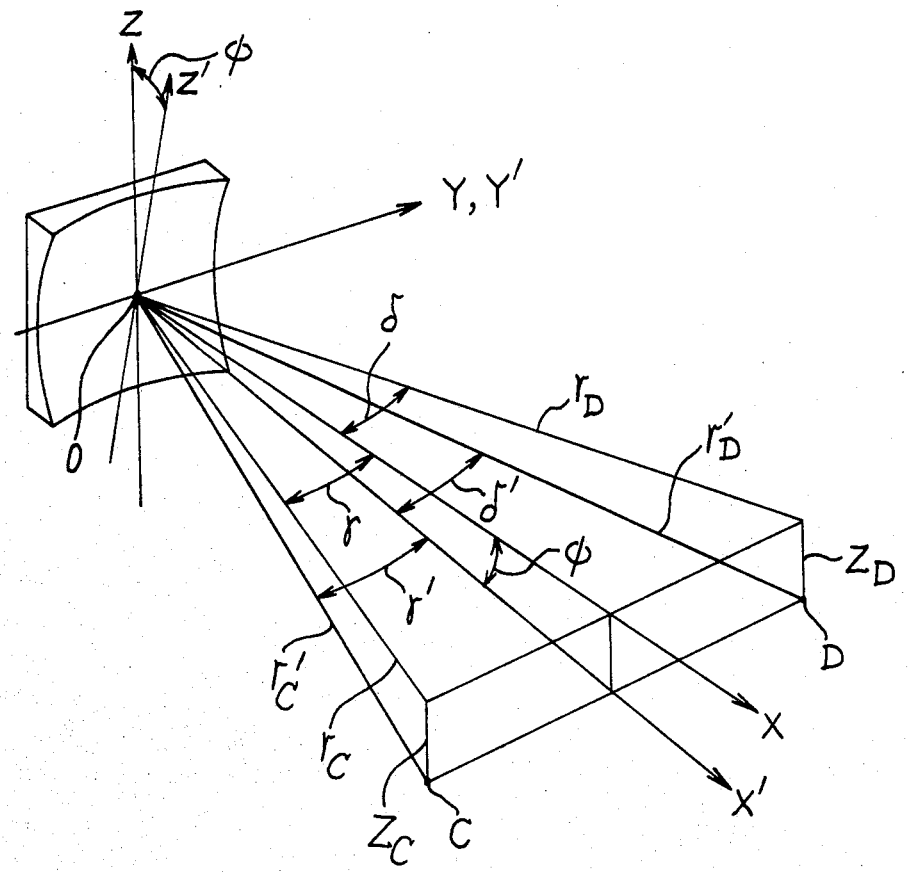
FIG. 2 is a schematic perspective view for explanation of a method of holographically forming a grating used in the monochromator of the invention.

Case B is of practical interest because it can be easily applied to the recording alignment system. If a new X'Y'-plane is defined by rotating the XY-plane about the Y axis through an angle $\phi = \tan^{-1}(Z_C/r_C \cos \gamma)$, the points C, D and O will lie in the X'Y'-plane as shown in FIG. 2. The reduced coordinates of C and D are denoted by $C(r_C', \gamma')$ and $D(r_D', \delta')$, where $$r'_C = r_C\sqrt{(\cos\tau/\cos\phi)^2 + \sin^2\tau} \; , \; \tan\tau' = \tan\tau\cos\phi, \quad (15)$$

$$r'_D = r_D\sqrt{(\cos\delta/\cos\phi)^2 + \sin^2\delta} \; , \; \tan\delta' = \tan\delta\cos\phi.$$

If Eq. (11) is substituted into Eqs. (4') and (5), respectively, the following equations are obtained:

$$F'_{011} = -\frac{Z}{r} - \frac{Z'}{r'} + \frac{m\lambda}{\sigma} A_{011} \quad (16)$$

and $$F'_{111} = -\frac{Z}{r^2}\sin\alpha - \frac{Z'}{r'^2}\sin\beta + \frac{m\lambda}{\sigma} A_{111} \quad (17)$$

where $A_{011}$ and $A_{111}$ are defined as:

$$A_{011} = \frac{\sigma}{\lambda_0}(\cos\delta - \cos\tau)\tan\phi \quad (18)$$

and $$A_{111} = \frac{\sigma}{2\lambda_0}\left(\frac{\sin 2\delta}{r_D} - \frac{\sin 2\tau}{r_C}\right)\tan\phi. \quad (19)$$

The ratio $\eta$ of $A_{111}$ and $A_{011}$ is obtained from Eqs. (18) and (19) as follows:

$$\eta = \frac{A_{111}}{A_{011}} = \left(\frac{\sin 2\delta}{r_D} - \frac{\sin 2\tau}{r_C}\right)/2(\cos\delta - \cos\tau) \quad (20)$$

In this case, Eq. (11) is reduced to $$A_{111} = \frac{D_2(\theta_2) - D_2(\theta_1)}{D_1(\theta_2) - D_1(\theta_1)}, \quad (21)$$

where $$D_1(\theta) = -\frac{Z}{r}\left[-\frac{\eta}{2r}\left(\frac{\sin(2\theta + K)}{2} - \theta\cos K\right) + \quad (22)\right.$$

-continued $$\frac{\eta}{2r'}\left(\frac{\sin(2\theta - K)}{2} - \theta\cos K\right) +$$

$$\frac{1}{4rr'}\left\{-\frac{\cos 3\theta}{3} + \cos\theta + \cos(2K + \theta) + \cos(\theta - 2K)\right\} -$$

$$\left.\frac{6\cos\theta - \cos(3\theta - 2K) + 3\cos(2K - \theta)}{4r^2}\right]$$

and $$D_2(\theta) = 2\cos K\left[\frac{\eta^2(2\theta - \sin 2\theta)}{4} + \right.$$

$$\frac{\eta}{6r'}\{6\cos(\theta - K) + 3\cos(\theta + K) - \cos(3\theta - K)\} +$$

$$\left.\frac{1}{32r'^2}\{64\theta + 4\theta\cos 2K - 4\sin 2(\theta - K) + \sin(4\theta - 2K)\}\right].$$

If the proper value of $A_{111}$ is known from Eqs. (20), (21) and (22), the values of $Z_C$ and $Z_D$ can be obtained from Eq. (7) through Eq. (18) or (19).

By way of example, three monochromators of the off-plane mounting constant deviation type have been designed each with an aberration-corrected concave diffraction grating, the off-plane recording parameters $Z_C$ and $Z_D$ of which have been calculated by each of the above-mentioned methods A and B.

The required wavelength range is from 200 to 750 nm in the first negative order (m = -1); the radius of curvature R of the grating is 150 mm, the effective grating constant $\sigma$ is 1/900 mm; and the wavelength $\lambda_o$ of the light of holographic recording is 441.6 nm.

To minimize the terms $F_{200}$, $F_{020}$ and $F_{120}$ in the light-path function F the following recording and mounting parameters are first determined:

$2K = \alpha + \beta = 21.6°$
$\gamma = 23.904°$
$\delta = -0.445°$
$r = 149.84$ mm
$r' = 149.84$ mm
$r_C = 149.698$ mm
$r_D = 150.328$ mm The above conditions minimize coma-type aberrations and astigmatism simultaneously.

The parameters $Z_C$ and $Z_D$ calculated by the methods A and B are in the following table:

|  |  | Z = 4 mm | Z = 8 mm | Z = 15 mm |
|---|---|---|---|---|
| Method A | $Z_C =$ | −3.992 mm | −7.984 mm | −14.970 mm |
|  | $Z_D =$ | −4.010 mm | −8.018 mm | −15.033 mm |
| Method B | $Z_C =$ | −2.740 mm | −5.480 mm | −10.276 mm |
|  | $Z_D =$ | −3.010 mm | −6.019 mm | −11.287 mm |

From the above it will be seen that the two light sources are positioned below the Rowland plane for recording of the groove pattern.

Figure 3:
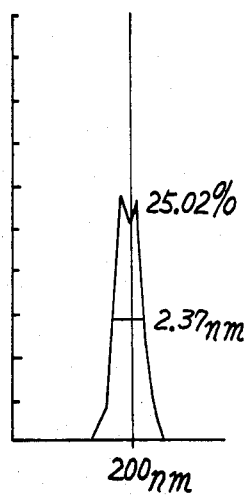
FIGS. 3(a) to 3(c) show line profiles in a conventional inplane monochromator having a conventional grating.
Figure 3:
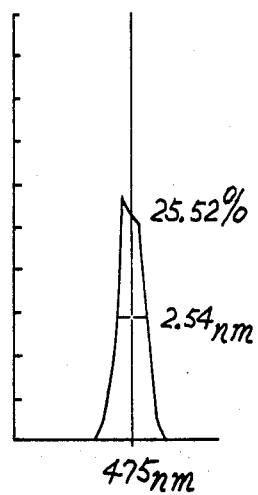
Figure 3:
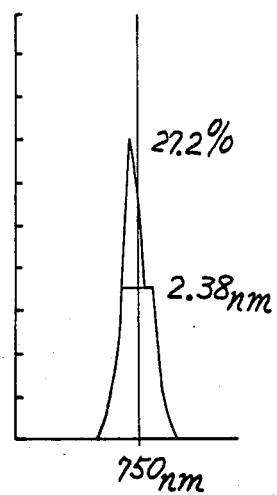

FIGS. 3(a) to (c) show the line profiles, calculated theoretically, of the spectral image formed by monochromatic lights of wavelengths 200 nm, 475 nm and 750 nm, repectively, in the exit slit of a conventional monochromator having a conventional grating formed by in-plane holographic recording (that is, $Z_C=Z_D=0$).

The orign corresponds to the center of the exit slit of the monochromator and the distance therefrom in the direction of dispersion expressed in wavelength is taken along the abscissa, with the relative light intensity being taken along the ordinate. The half-value width is about 2.5 nm.

Figure 4:
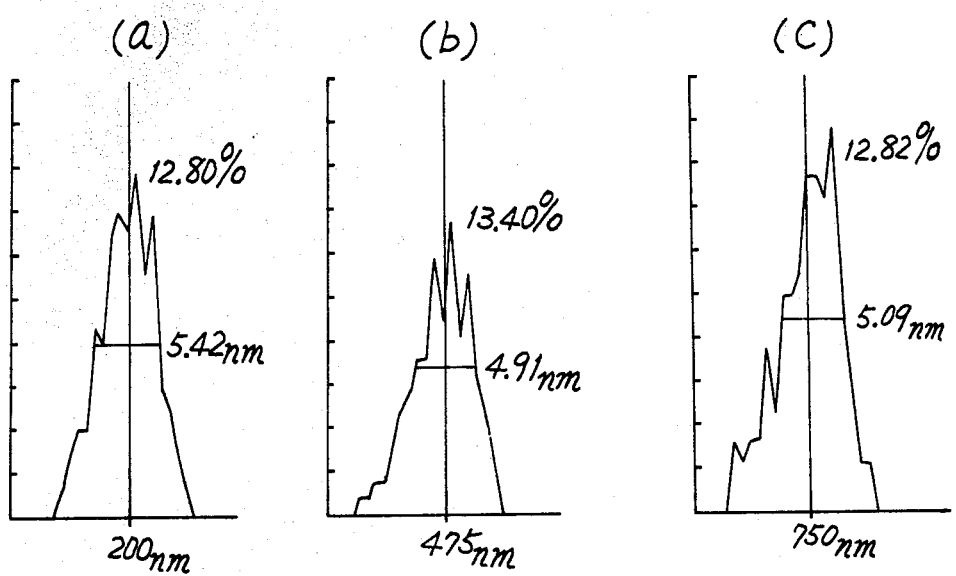
FIGS. 4(a) to 4(c) show line profiles in an off-plane monochromator having a conventional grating with the entrance and exit slits thereof disposed at different levels.
Figure 5:
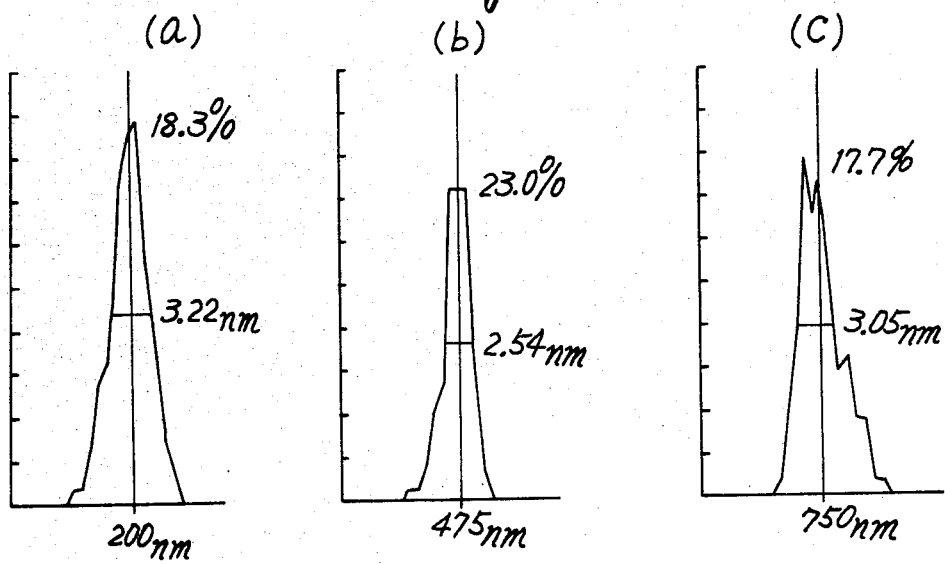
FIGS. 5(a) to 5(c) show line profiles in the monochromator constructed in accordance with the invention.

FIGS. 4(a) to (c) show similar graphs obtained with a grating of the same conventional type as mentioned above but with the entrance and exit slits of the monochromator being mounted off-plane, that is, 8 mm above and below the Rowland plane. The aberrations in the dispersion direction are about two times those in FIGS. 3(a) to (c), with resulting deterioration of the resolution. FIGS. 5(a) to (c) show similar graphs obtained with a monochromator constructed in accordance with the invention, with the grating formed by the previously mentioned method B and the entrance and exit slits mounted off-plane. In these graphs, the half-value width of the spectral images at each of the wavelength is between 2.5 and 3.2 nm. This means that the monochromator of the invention has about the same level of resolution as the conventional monochromator of the in-plane mounting type in which the entrance and exit slits are arranged in the Rowland plane.

What I claim is:

1. A monochromator comprising a concave grating having a Rowland plane defined by the geometry of said grating, means for defining an entrance slit and means for defining an exit slit, said entrance slit being positioned on one side of the Rowland plane and said exit slit being positioned on the opposite side of said Rowland plane, said grating having been holographically formed by using two coherent light sources for holographic recording positioned on the same side of said Rowland plane.

2. The monochromator of claim 1, wherein a deviation angle measured between said entrance and exit slits is constant and said grating is rotated about its own axis for wavelength scanning.

3. The monochromator of claim 1, wherein the distances $Z_C$ and $Z_D$ from said Rowland plane to said two coherent light sources are determined by $$Z_C/r_C = Z_D/r_D = \phi$$

where $r_C$ and $r_D$ are the respective distances along said Rowland plane from the geometrical center of said grating to said two coherent light sources and where $\phi$ is a constant.

4. The monochromator of claim 3, wherein $0 < \phi < 0.1$.

5. The monochromator of claim 1, wherein the distances $Z_C$ and $Z_D$ from said Rowland plane to said two coherent light sources are determined by $$Z_C/r_C \cos \gamma = Z_D/r_D \cos \delta = \psi$$

where $r_C$ and $r_D$ are the respective distances along said Rowland plane from the geometrical center of said grating to said two coherent light sources, where $\gamma$ and $\delta$ are the incident angles of the coherent light rays measured in said Rowland plane, and $\psi$ is the angle between said Rowland plane and a second plane passing through the geometrical center of said grating and said two coherent light sources.

6. The monochromator of claim 1, wherein $0 < \psi < 0.1$, $\psi$ being the angle between said Rowland plane and a second plane passing through the geometrical center of said grating and said two coherent light sources.

7. A concave grating for use in a monochromator and having a Rowland plane defined by the geometry of said grating, formed by holography with two coherent light sources for holographic recording positioned off and on the same side of the Rowland plane.

8. The concave grating of claim 7, wherein the distances $Z_C$ and $Z_D$ from said Rowland plane to said two light sources are determined by $$Z_C/r_C = Z_D/r_D = \phi$$

where $r_C$ and $r_D$ are the respective distances along said Rowland plane from the geometrical center of said grating to said two coherent light sources and where $\phi$ is a constant.

9. The concave grating of claim 8, wherein $0 < \phi < 0.1$.

10. The concave grating of claim 7, wherein the distances $Z_C$ and $Z_D$ from said Rowland plane to said two light sources are determined by $$Z_C/r_C \cos \gamma = Z_D/r_D \cos \delta = \psi$$

where $r_C$ and $r_D$ are the respective distances along said Rowland plane from the geometrical center of said grating to said two coherent light sources, where $\gamma$ and $\delta$ are the incident angles of the coherent light rays measured in said Rowland plane, and $\psi$ is the angle between said Rowland plane and a second plane passing through the geometrical center of the grating and said two coherent light sources.

11. The concave grating of claim 10, wherein $0 < \phi < 0.1$.

* * * * *